(12) United States Patent
Kay et al.

(10) Patent No.: US 12,062,896 B2
(45) Date of Patent: Aug. 13, 2024

(54) JUNCTION BOX COVER AND LIGHTING FIXTURE ASSEMBLY

(71) Applicant: PureEdge Lighting LLC, Chicago, IL (US)

(72) Inventors: Gregory L. Kay, Chicago, IL (US); James E. O'Shea, Chicago, IL (US)

(73) Assignee: PureEdge Lighting LLC, Chicago, IL (US)

( * ) Notice: Subject to any disclaimer, the term of this patent is extended or adjusted under 35 U.S.C. 154(b) by 175 days.

(21) Appl. No.: 17/822,066

(22) Filed: Aug. 24, 2022

(65) Prior Publication Data

US 2023/0055757 A1 Feb. 23, 2023

Related U.S. Application Data

(62) Division of application No. 16/422,422, filed on May 24, 2019, now Pat. No. 11,469,580.

(51) Int. Cl.
*H02G 3/08* (2006.01)
*F21S 8/00* (2006.01)
*F21S 8/04* (2006.01)
*F21V 23/06* (2006.01)
*H02G 3/12* (2006.01)
*H02G 3/14* (2006.01)

(52) U.S. Cl.
CPC .............. *H02G 3/081* (2013.01); *F21S 8/036* (2013.01); *F21S 8/043* (2013.01); *F21V 23/06* (2013.01); *H02G 3/12* (2013.01); *H02G 3/123* (2013.01); *H02G 3/14* (2013.01)

(58) Field of Classification Search
None
See application file for complete search history.

(56) References Cited

U.S. PATENT DOCUMENTS

| | | | | |
|---|---|---|---|---|
| 1,124,653 A | * | 1/1915 | Phelps | H02G 3/123 220/3.6 |
| 3,302,918 A | * | 2/1967 | Cohen | H01R 13/62 362/404 |
| 5,296,647 A | * | 3/1994 | Banker | H02G 3/088 174/58 |
| 6,146,191 A | * | 11/2000 | Kerr, Jr. | H02G 3/123 439/537 |

(Continued)

*Primary Examiner* — Krystal Robinson
(74) *Attorney, Agent, or Firm* — Bishop, Diehl & Lee, Ltd.

(57) ABSTRACT

A junction box cover assembly for attachment over an opening in an electrical junction box allows for a concealed connection to avoid detracting from the lighting fixture. The assembly includes a cover plate capable of being mounted to a junction box, the cover plate having an opening there through defined by a first threaded collar extending from the cover plate, a hub having a flange radially extending from a periphery of a second threaded collar defining a passage and configured to attach to the first threaded collar of the cover plate, and a circular insert detachably connected within the passage defined by the threaded collar, the circular insert having an opening for passing electrical wiring from the junction box through the passage, out the insert opening and to a light fixture. The cover plate and the radially extending flange somewhat sandwich a surface, such as drywall or wallboard, and the flange is configured to permit covering with spackling paste or joint compound to conceal the flange.

7 Claims, 6 Drawing Sheets

(56) References Cited

U.S. PATENT DOCUMENTS

| | | | | |
|---|---|---|---|---|
| 6,511,269 B1* | 1/2003 | Smasne | ............... | H02G 3/12 |
| | | | | 33/528 |
| 7,151,219 B1* | 12/2006 | Gretz | ............... | H02G 3/14 |
| | | | | 439/535 |
| 7,806,723 B2* | 10/2010 | Chong | ............... | H02G 3/22 |
| | | | | 439/571 |
| 2002/0157851 A1* | 10/2002 | Compagnone, Jr. | ..... | H02G 3/12 |
| | | | | 174/58 |
| 2006/0260835 A1* | 11/2006 | Johnson | ............... | H02G 3/125 |
| | | | | 174/58 |
| 2020/0005682 A1* | 1/2020 | Kirvan | ............... | H02G 3/081 |

* cited by examiner

JUNCTION BOX COVER AND LIGHTING FIXTURE ASSEMBLY

RELATED APPLICATION

This application is a divisional of U.S. patent application Ser. No. 16/422,422, filed on May 24, 2019, titled "Junction Box Cover and Lighting Fixture Assembly" and now U.S. patent Ser. No. 11/469,580. The '422 application is hereby incorporated by reference.

TECHNICAL FIELD OF THE INVENTION

The present invention relates to a cover for an electric junction box concealed within a wall of ceiling space. More specifically, the invention relates to a cover for a junction box which facilitates connection of a lighting fixture.

BACKGROUND OF THE INVENTION

In homes and businesses, effective lighting has evolved to be as much an aesthetic feature in a space as it is a functional feature. As a result of this evolution, lighting has needed to become more diverse and adaptable to changing fixtures from recessed lights to hanging lights, from flood lights to spotlights.

Recessed lighting is a common type of lighting fixture used in millions of homes, offices, and other buildings throughout the world. These lights use fixtures which are mounted behind a surface (typically above the ceiling), with an opening in the surface to allow light to emanate from a source (e.g., an LED bulb) in the fixture. Can-lights are one type of recessed lighting which is widely used, both for broad area lighting and spotlights. Can-lights typically include a housing (a.k.a., can) mounted around a light bulb socket which is electrically wired to a power source via a light switch for controlling the light. U.S. Pat. No. 7,325,948 to Kay discloses a type of recessed lighting assembly. The '948 patent is hereby incorporated by reference in its entirety.

A problem with such "built-in" lighting fixtures is they cannot be readily converted to different lighting fixtures. For example, a recessed can-light cannot be easily converted to a hanging light fixture and the hanging light fixture cannot be easily converted to a spotlight. Further, connectors and adapters which may allow conversion from one fixture to another draw attention to the fixture, which detracts from the aesthetic appeal of the lighting.

Until the invention of the present application, these and other problems in the prior art went either unnoticed or unsolved by those skilled in the art. The present invention provides a junction box cover and lighting assembly which provide multiple lighting options without sacrificing design, style, or ease of installation.

SUMMARY OF THE INVENTION

There is disclosed herein an improved junction box cover and lighting assembly which avoids the disadvantages of prior devices while affording additional structural and operating advantages.

Generally speaking, an inventive junction box cover assembly for attachment over an opening in an electrical junction box comprises a cover plate capable of being mounted to a junction box, the cover plate having an opening there through defined by a first threaded collar extending from the cover plate, a hub having a flange radially extending from a periphery of a second threaded collar defining a passage and configured to attach to the first threaded collar of the cover plate, and a circular insert detachably connected within the passage defined by the threaded collar, the circular insert having an opening for passing electrical wiring from the junction box through the passage, out the insert opening and to a light fixture.

In an embodiment of the disclosed cover plate, the cover plate and the radially extending flange sandwich a surface, such as drywall or wallboard. The flange is configured to permit covering with spackling paste or joint compound to conceal the flange.

In a specific embodiment, the assembly further comprises a light fixture connector coupled to the insert. The light fixture connector is configured to support a suspension-type light fixture. Alternatively, the light fixture may be integral to the insert.

Further, a method for concealing an electric junction box mounted within a building wall or ceiling is also described. Generally speaking, the method comprises the steps of providing an open electric junction box within a building wall or ceiling, attaching a cover plate to the open junction box such that the cover plate abuts a first surface external to the junction box, the cover plate having an opening there through defined by a first threaded collar extending from the cover plate, attaching a hub to the first threaded collar of the cover plate, the hub having a flange radially extending from a periphery of a second threaded collar defining a passage, the flange being configured to mount flush against a second surface external to the junction box and opposite the first surface, detachably securing a circular insert within the passage defined by the second threaded collar, the circular insert having an opening for passing electrical wiring from the junction box through the passage, out the insert opening and to a light fixture, and, applying a concealing material against the flange around the passage having the secured insert.

In a specific embodiment, the method further comprises painting the concealing material to match the building wall or ceiling into which it is mounted.

These and other aspects of the invention may be understood more readily from the following description and the appended drawings.

BRIEF DESCRIPTION OF THE DRAWING

For the purpose of facilitating an understanding of the subject matter sought to be protected, there are illustrated in the accompanying drawings, embodiments thereof, from an inspection of which, when considered in connection with the following description, the subject matter sought to be protected, its construction and operation, and many of its advantages should be readily understood and appreciated.

DETAILED DESCRIPTION OF THE INVENTION

Figure 1:
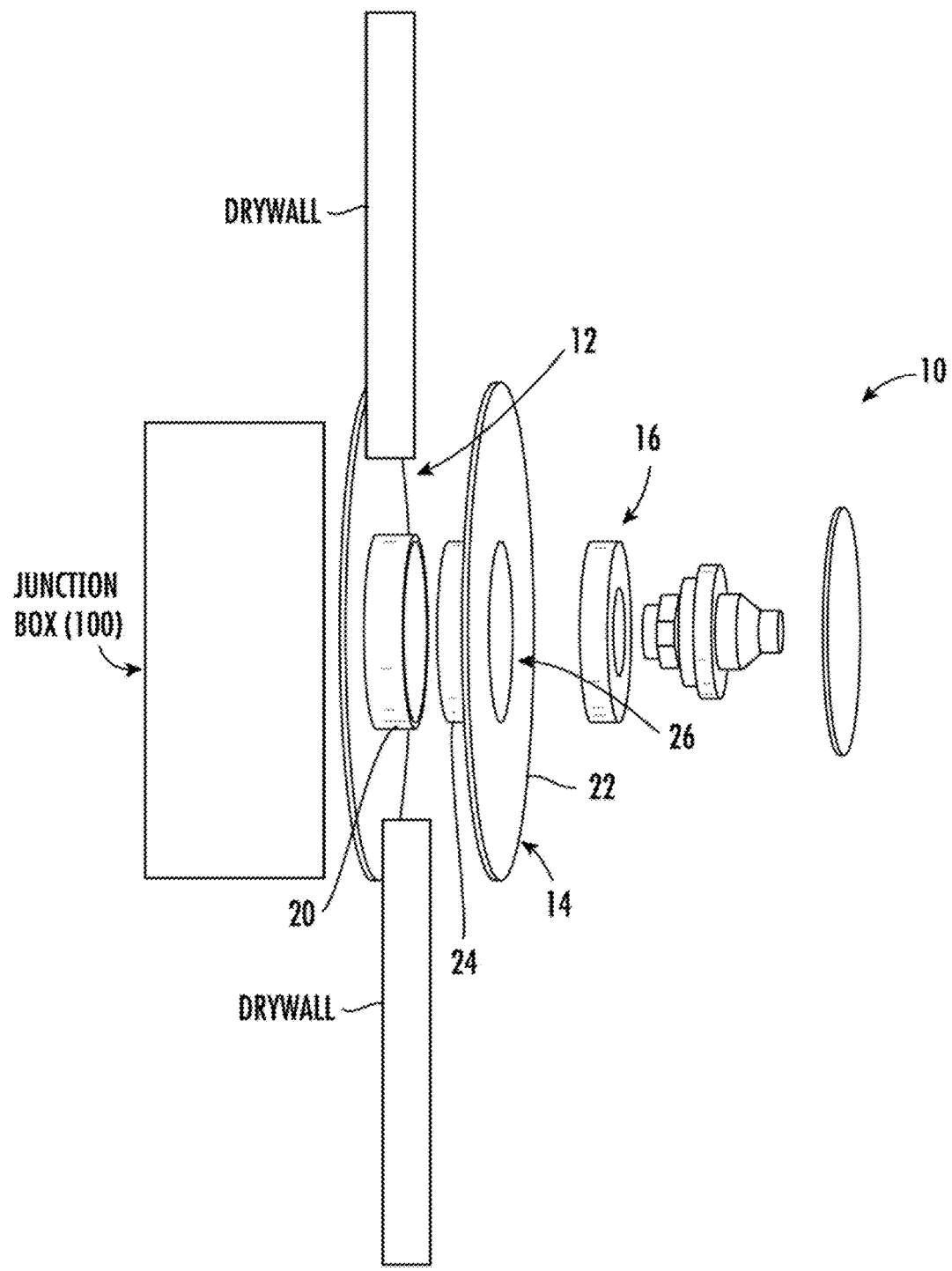
FIG. 1 is a side perspective view showing an exploded embodiment of the disclosed junction box cover assembly.

While this invention is susceptible of embodiments in many different forms, there is shown in the drawings and will herein be described in detail at least one preferred embodiment of the invention with the understanding that the present disclosure is to be considered as an exemplification of the principles of the invention and is not intended to limit the broad aspect of the invention to any of the specific embodiments illustrated.

Referring to FIGS. 1-8, there are illustrated embodiments of a junction box cover assembly, generally designated by the numeral 10. The illustrated cover assemblies 10 are for use with a junction box 100 mounted in a wall, ceiling, floor, millwork, countertop, or riser. However, it should be understood that the principles of the invention can be more broadly applied to a junction box mounted within most any vertical, horizontal, or angled surface whether it is made of or finished with plaster, plywood, wallboard, laminate, ceramic, granite, stone, polymer or most any other solid suitable material.

The disclosed junction box cover assembly 10 allows a user to mount a lighting fixture quickly and efficiently with a substantially flush and nearly invisible interface at the mounting surface—i.e., ceiling or wall. As shown, the assembly 10 comprises a cover plate 12, a hub 14, and an insert 16. The cover (or adapter) plate 12 secures to the open junction box by any usual means (e.g., screws, clips) and is preferably of a single piece construction, though a two-piece construction may be useful for certain applications. The plate 12 includes a threaded collar 20 (preferably threaded on an internal surface) extending outward from a middle section of the plate 12 and defining an opening there through. The hub 14 includes a radially extending flange 22, and a second threaded collar 24 (preferably threaded on the external surface) which engages with the threaded collar 20 of the cover plate 12. A passage 26 defined by the threaded collars 20 and 24 is configured to provide an attachment site for the circular insert 16. Preferably, the insert 16 locks into the passage 26 by known means. Electrical wires from the junction box 100 can be fed through the passage 26, and then through the opening in the circular insert 16.

In a specific embodiment, the 1.6 inch diameter of passage 26 is suitable for passing an electronic ballast or driver through to place in the junction box hidden in a wall, ceiling, or other suitable surface. A driver is a small electronic filled box, typically having dimensions (in inches) of about 1.3× 0.9×2.7.

Figure 2:
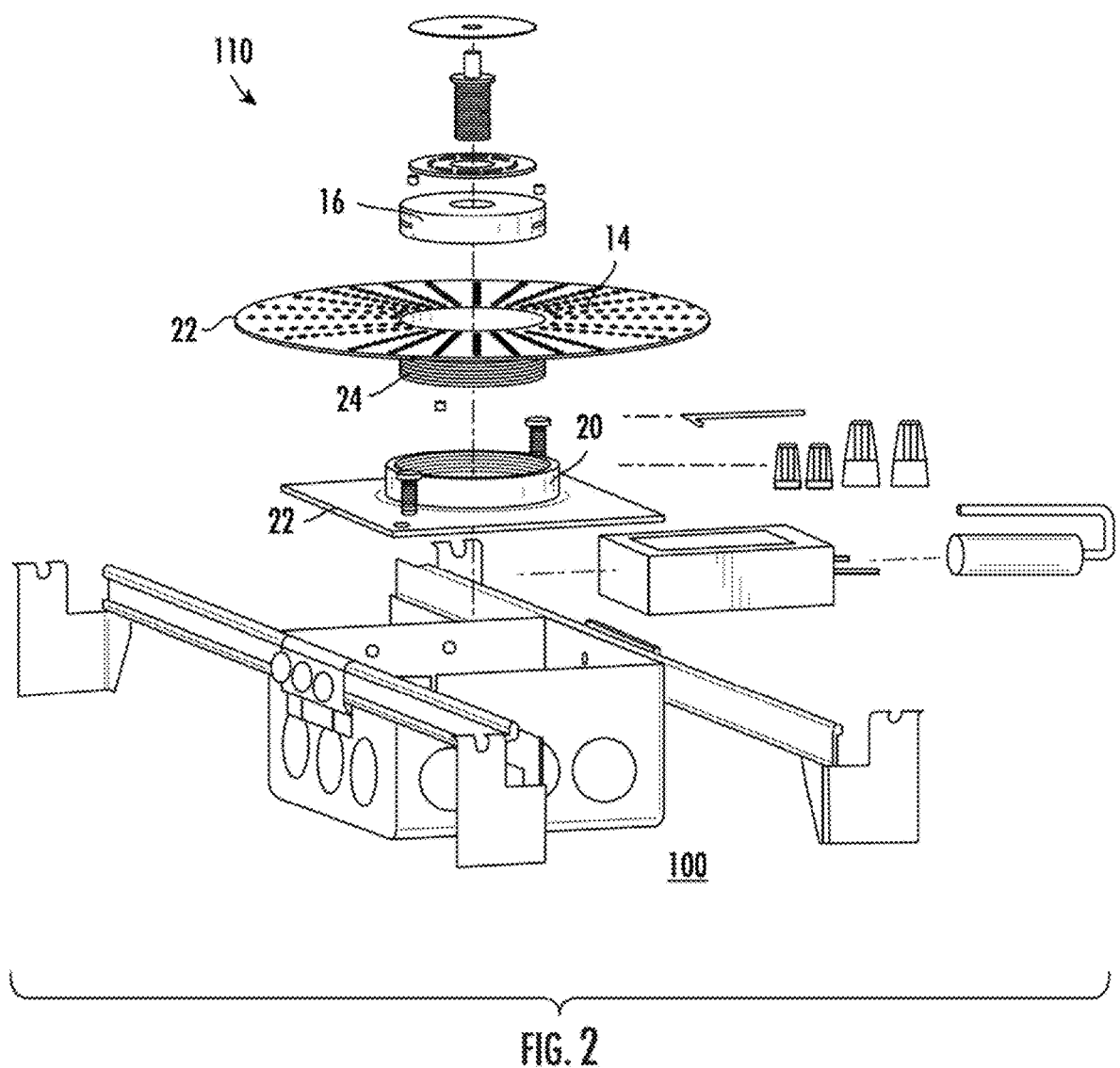
FIG. 2 is a schematic of an embodiment of the disclosed junction box cover assembly.

In another embodiment, the insert 16 can be customized to allow for a suspension-type lighting fixture connector (for example, see FASTJACK™ Connector by PureEdge Lighting at https://www.lightology.com/index.php?module=prod_detail&prod_id=124694&cat_id=201). This configuration is illustrated in FIG. 2. The illustrated assembly 110 allows a hanging light to be powered from connection at the junction box 100.

Figure 3:
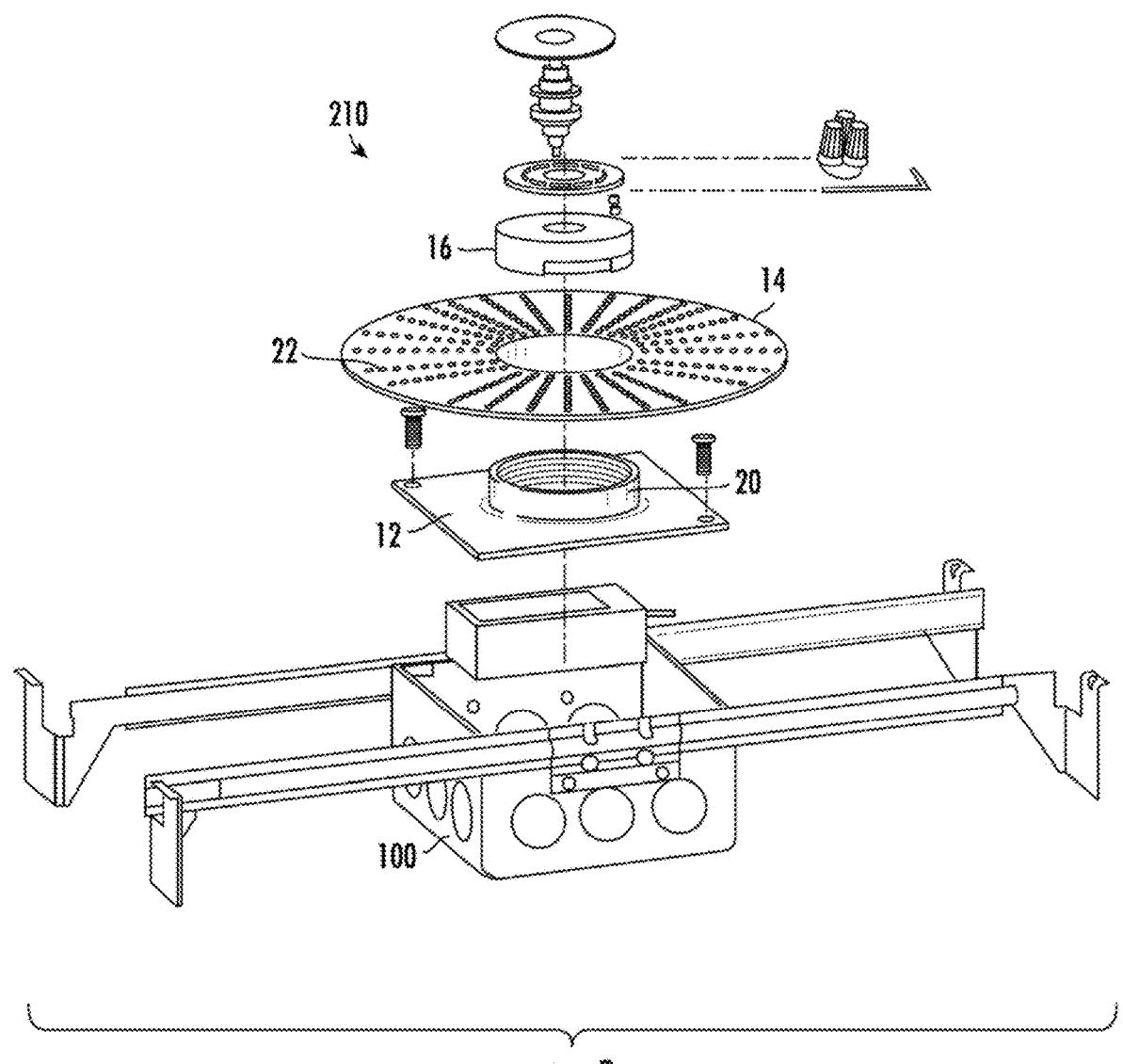
FIG. 3 is a schematic of another embodiment of the disclosed junction box cover assembly.
Figure 4:
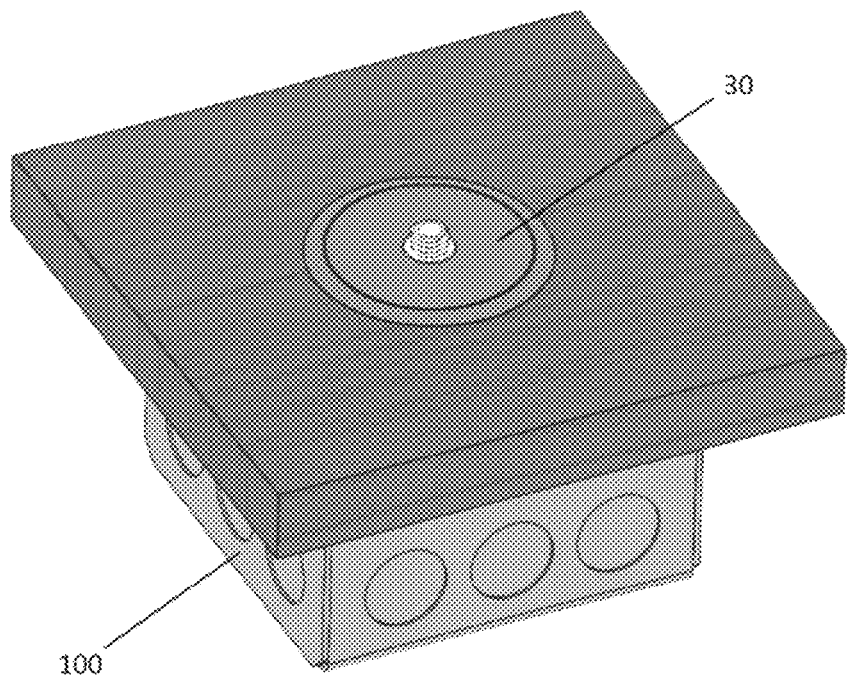
FIG. 4 is a perspective view of another embodiment illustrating a junction box cover assembly used with millwork (i.e., wood grain) providing a support surface.
Figure 5:
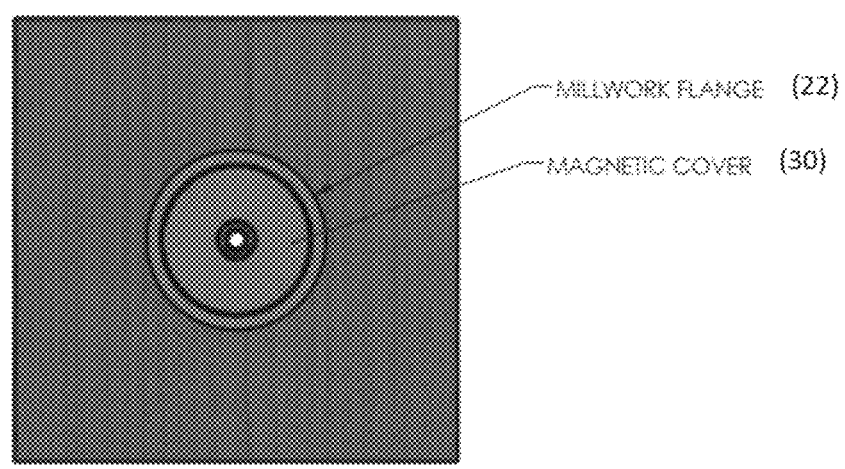
FIG. 5 is front plan view of the embodiment of FIG. 4.
Figure 6:
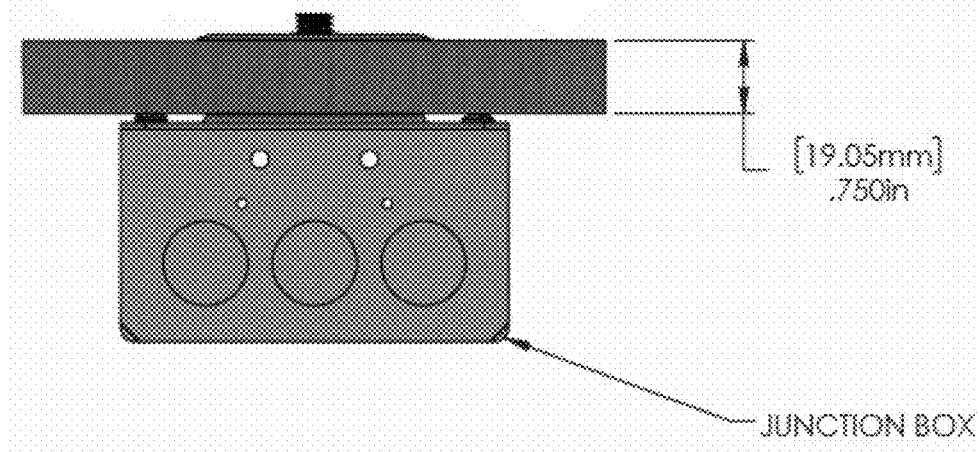
FIG. 6 is a side view of the embodiment of FIG. 4.
Figure 7:
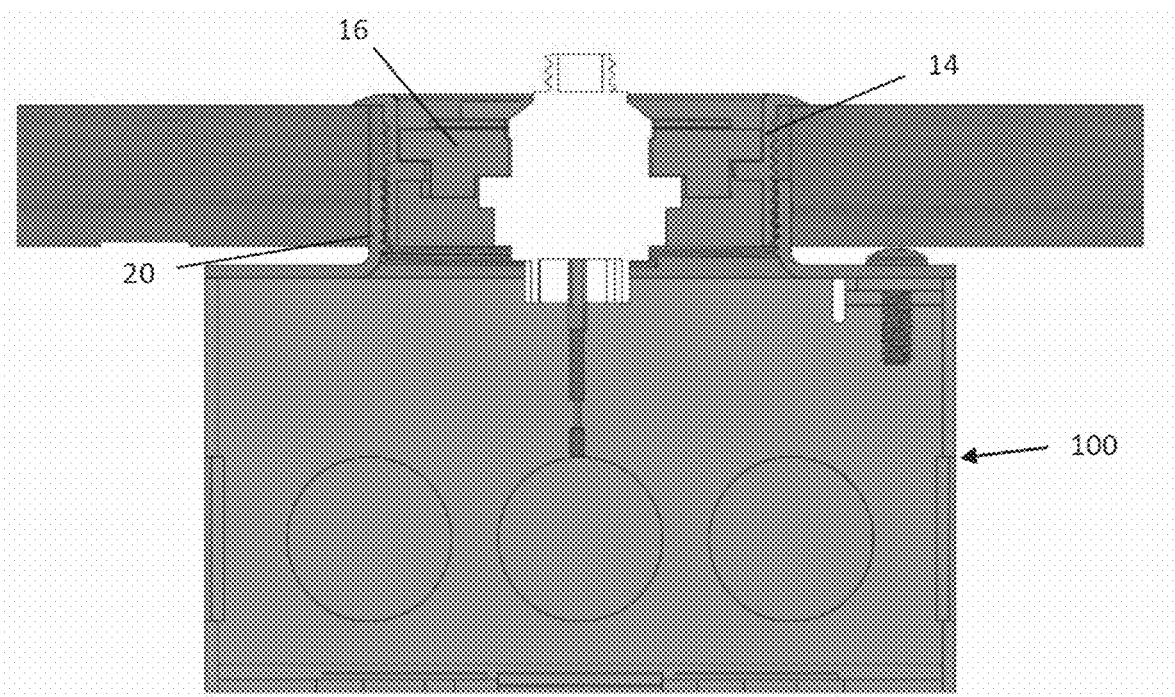
FIG. 7 is a side cross-section of the embodiment of FIG. 4.
Figure 8:
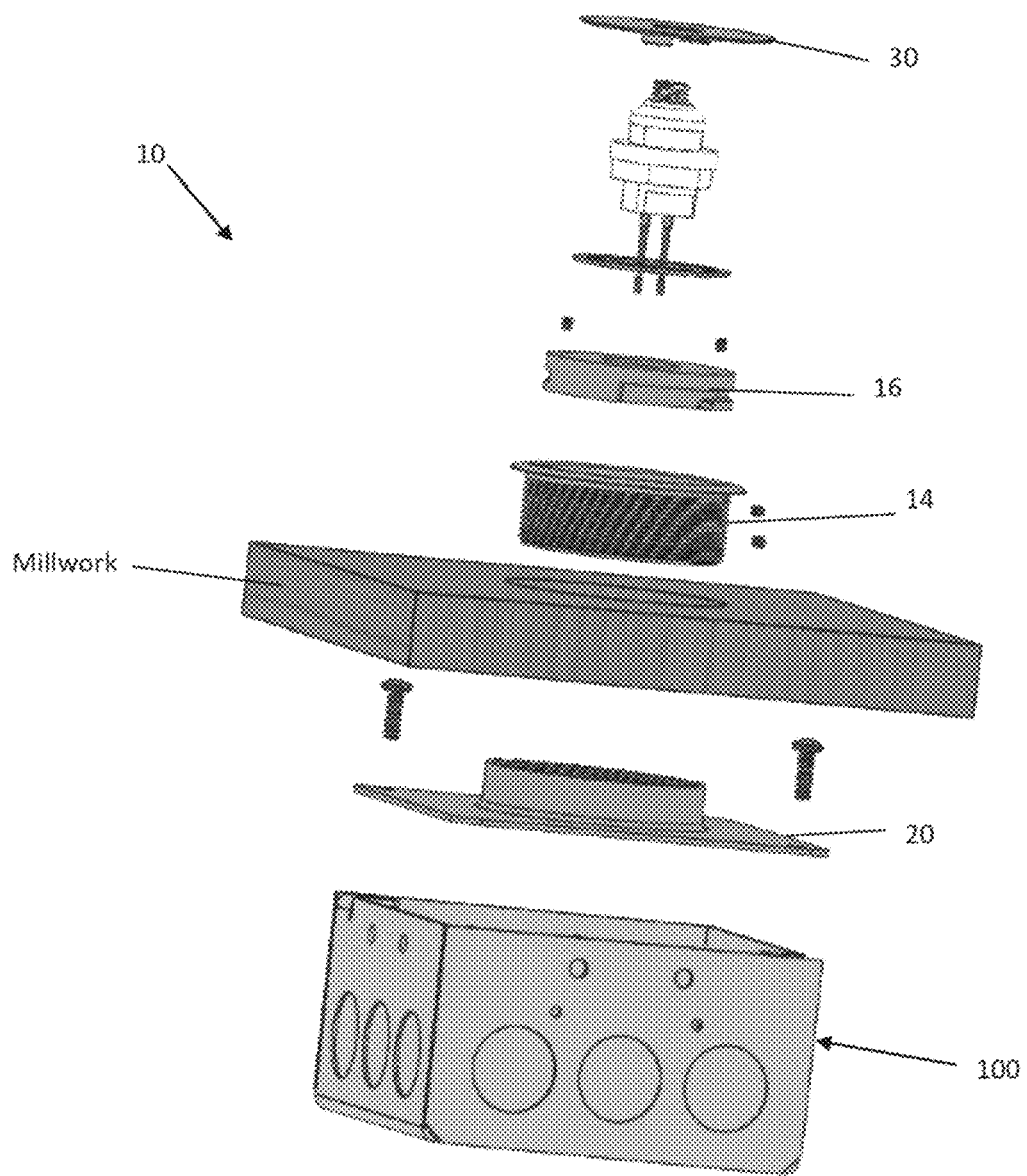
FIG. 8 is an exploded view of the embodiment of FIG. 4.

Alternatively, connectors can be added to the insert 16 for mounting fixtures directly, like a spot light (for example, see PISTON MONOPOINT™ lighting fixture by PureEdge Lighting at https://www.lightology.com/index.php?module=prod_detail&prod_id=619823). FIG. 3 illustrates such an assembly 210.

In several of the embodiments, the radial flange 22 of the hub 14 is preferably configured to be covered with a joint compound and painted over to hide the installation, leaving only a suspension wire or cable visible. Ideally, this plastered in finish gives a minimum of visual attention to the mounting hardware used.

However, as illustrated in FIGS. 4-8, the cover assembly 10 may utilize millwork to conceal the junction box 100. In such an embodiment, joint compound and paint would not be appropriate. Instead, as shown best in FIGS. 4, 5 and 8, a magnetic metal cover 30, preferably plated with polished or satin nickel or chrome, is used to finish the look of the assembly 10. The cover 30 magnetically connects to the hub 14, which has a reduced flange 22 compared to the previous embodiments. In all other respects, this embodiment is similar to previously described embodiments.

The present invention also includes a method for concealing an electric junction box 100 mounted within a building wall or ceiling. The junction box 100 should be opened to allow connection. Then, a cover plate 12 as previously described, is attached to the open junction box such that the cover plate 12 faces a first surface external to the junction box. The hub 14 attaches to the threaded collar 20 of the cover plate as the radially extending flange 22 from a periphery of a second threaded collar 24 mounts flush against an external surface of the wall or ceiling.

The circular insert 16 is then secured within the passage 26 defined by the second threaded collar 24. The opening of the insert 16 allows passing of electrical wiring from the junction box through the passage, out the insert opening and to a light fixture. Finally, concealing material, such as a spackling paste or joint compound, is applied against the flange 22 around the passage having the secured insert 16. Painting the concealing material to match the building wall or ceiling into which it is mounted completes the concealment.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of applicants' contribution. The actual scope of the protection sought is intended to be defined in the following claims when viewed in their proper perspective based on the prior art.

What is claimed is:

1. A method for concealing an electric junction box mounted within a building wall or ceiling, the method comprising:

providing an open electric junction box within a building wall or ceiling;

attaching a cover plate to the open junction box such that the cover plate abuts a first surface external to the junction box, the cover plate having an opening therethrough defined by a first threaded collar extending from the cover plate;

attaching a hub to the first threaded collar of the cover plate, the hub having a flange radially extending from a periphery of a second threaded collar defining a passage, the flange being configured to mount flush against a second surface external to the junction box and opposite the first surface;

detachably securing a circular insert within the passage defined by the second threaded collar, the circular insert having an opening for passing electrical wiring from the junction box through the passage, out the insert opening and to a light fixture; and applying a concealing material against the flange around the passage having the secured insert.

2. The method of claim 1, further comprising painting the concealing material to match the building wall or ceiling into which it is mounted.

3. The method of claim 1, further comprising coupling a light fixture connector to the insert.

4. The method of claim 3, wherein the light fixture connector supports a suspension-type light fixture.

5. The method of claim 4, wherein the light fixture is integral to the insert.

6. The method of claim 1, wherein the flange is perforated to facilitate application of the concealing material.

7. The method of claim 1, further comprising attaching a magnetic cover to the circular insert.

* * * * *